(12) United States Patent
Yoshida

(10) Patent No.: US 11,546,546 B2
(45) Date of Patent: Jan. 3, 2023

(54) IMAGE CAPTURE APPARATUS, IMAGE PROCESSING APPARATUS, AND CONTROL METHOD

(71) Applicant: CANON KABUSHIKI KAISHA, Tokyo (JP)

(72) Inventor: Masashi Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/392,443

(22) Filed: Aug. 3, 2021

(65) Prior Publication Data

US 2022/0060653 A1 Feb. 24, 2022

(30) Foreign Application Priority Data

Aug. 21, 2020 (JP) .............................. JP2020-140215

(51) Int. Cl.
*H04N 5/232* (2006.01)
*H04N 5/77* (2006.01)
*H04N 5/38* (2006.01)

(52) U.S. Cl.
CPC ........... *H04N 5/77* (2013.01); *H04N 5/23229* (2013.01); *H04N 5/38* (2013.01)

(58) Field of Classification Search
CPC .... H04N 5/23222; H04N 5/2228; H04N 5/77; H04N 5/23229; H04N 5/38;

(Continued)

(56) References Cited

U.S. PATENT DOCUMENTS

| 9,635,213 | B1* | 4/2017 | Terrill ..................... H04N 1/215 |
| 2003/0189647 | A1* | 10/2003 | Kang ..................... H04N 5/232 |
| | | | 348/207.99 |
| 2015/0341549 | A1* | 11/2015 | Petrescu ............ H04N 5/23206 |
| | | | 348/207.1 |

FOREIGN PATENT DOCUMENTS

| JP | 2009044256 A | * | 2/2009 |
| JP | 2009044256 A | | 2/2009 |
| JP | 2013187620 A | | 9/2013 |

OTHER PUBLICATIONS

Machine English Translation, JP 2009-044256 A, Feb. 26, 2009 (Year: 2009).*

(Continued)

*Primary Examiner* — Nelson D. Hernández Hernández
(74) *Attorney, Agent, or Firm* — Rossi, Kimms & McDowell LLP

(57) ABSTRACT

An image capture apparatus comprises an image capturing unit, and a communication unit configured to transmit, to an image processing apparatus that develops RAW images, a plurality of RAW images obtained by the image capturing unit by performing continuous shooting. The communication unit, in a case where a setting at the time of shooting is a predetermined shooting setting, transmits one or more RAW images shot earlier than a time point when a predetermined shooting instruction is received among the plurality of RAW images before transmitting other RAW images, and in a case where the setting at the time of shooting is not the predetermined shooting setting, transmits one or more RAW images shot later than the time point when the predetermined shooting instruction is received among the plurality of RAW images before transmitting other RAW images.

11 Claims, 10 Drawing Sheets

(58) Field of Classification Search
CPC ......... H04N 2201/001; H04N 1/00183; H04N 1/00058; H04N 1/00061; H04N 1/00127
See application file for complete search history.

(56) References Cited

OTHER PUBLICATIONS

U.S. Appl. No. 17/151,655, filed Jan. 18, 2021 (a copy is not included because the cited application is not yet available to the public and the Examiner has ready access to the cited application).
U.S. Appl. No. 17/196,158, filed Mar. 9, 2021 (a copy is not included because the cited application is not yet available to the public and the Examiner has ready access to the cited application).

* cited by examiner

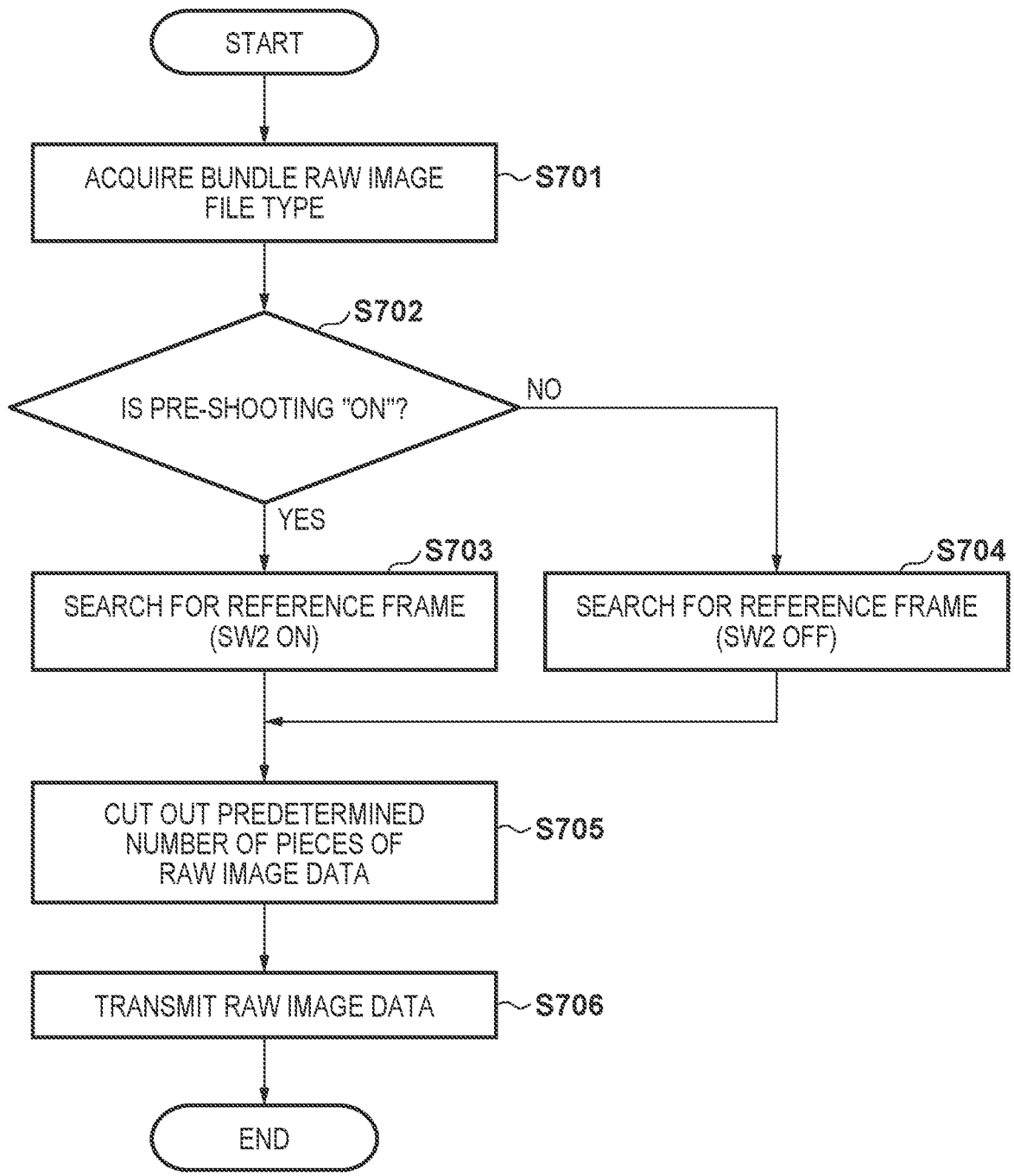

FIG. 8
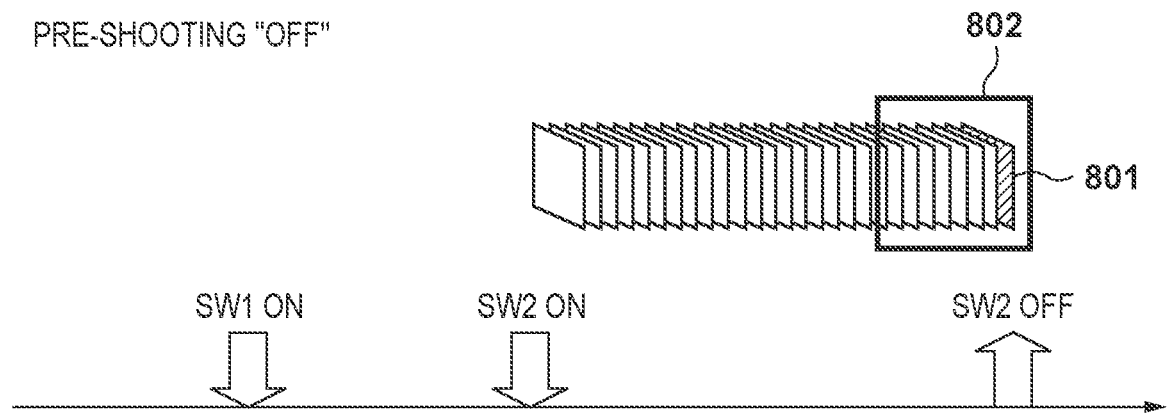
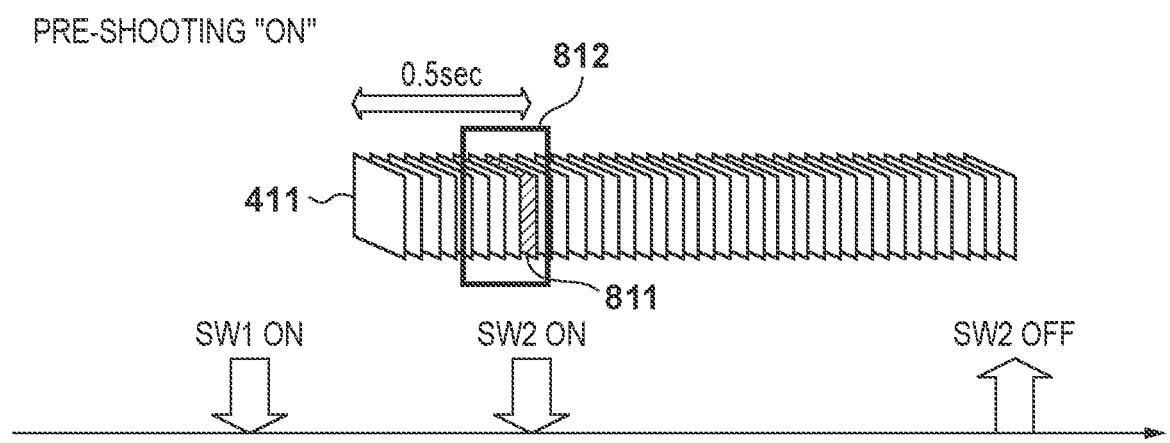

IMAGE CAPTURE APPARATUS, IMAGE PROCESSING APPARATUS, AND CONTROL METHOD

BACKGROUND OF THE INVENTION

Field of the Invention

The present invention relates to a system for performing development processing on RAW images.

Description of the Related Art

Due to the improvement in image sensor performance, the electronic shutter method, in which images are captured by controlling the timing of charge accumulation and reading by an image sensor, has become mainstream, replacing the mechanical shutter method, in which images are captured by mechanically actuating a shutter. Since the electronic shutter method, differing from the mechanical shutter method, does not generate any shutter sound during shooting, the electronic shutter method is suitable for a shooting scene in a quiet environment, for example. Furthermore, in the electronic shutter method, several tens of frames can be shot per second due to the improvement in the charge reading speed of image sensors.

In an image capture apparatus that can capture several tens of frames (for example, 30 frames) per second in such a manner, relatively time-consuming post-capture processing, such as compression processing and file creation processing, need to be omitted to transition to a state in which subsequent shooting can be performed. Thus, each one of the several tens of frames captured per second is recorded as RAW image data without development processing being performed thereon immediately after shooting. Furthermore, since thumbnail data for displaying is necessary even in the case of RAW image data, thumbnail data provided with a data size smaller than that when the data was captured is embedded into each frame. In such a manner, the overall processing time required for shooting is saved.

Furthermore, while development processing of RAW image data is conventionally performed using image development applications in digital cameras and PCs, development processing can now be performed by a cloud server via a network due to the recent improvement in communication environment. By performing development processing using the cloud server in such a manner, high-quality developed images can be realized while quickly incorporating new services and algorithms. Furthermore, the time required for development processing can be reduced by using a high-performance server. With regard to development processing by the cloud server, Japanese Patent Laid-open No. 2009-44256 discloses a system in which RAW image data is transmitted from an image capture apparatus to a server, and the RAW image data is subjected to development processing in the server and transmitted to the image capture apparatus.

However, in Japanese Patent Laid-open No. 2009-44256, RAW image data having a large data amount needs to be transmitted to the cloud server, and the transmission takes time. Furthermore, a large amount of time is required for the data processing in the server when all RAW image data is subjected to development processing in the cloud server.

SUMMARY OF THE INVENTION

The present invention has been made in consideration of the aforementioned problems, and realizes techniques for allowing development processing by a server to be performed efficiently.

In order to solve the aforementioned problems, the present invention provides an image capture apparatus that can communicate with an image processing apparatus that develops RAW images, comprising: a processor and a memory coupled to the processor and storing instructions that, when executed by the processor, cause the processor to function as: an image capturing unit; and a communication unit configured to transmit, to the image processing apparatus, a plurality of RAW images obtained by the image capturing unit by performing continuous shooting, wherein the communication unit, in a case where a setting at the time of shooting is a predetermined shooting setting, transmits one or more RAW images shot earlier than a time point when a predetermined shooting instruction is received among the plurality of RAW images before transmitting other RAW images, and in a case where the setting at the time of shooting is not the predetermined shooting setting, transmits one or more RAW images shot later than the time point when the predetermined shooting instruction is received among the plurality of RAW images before transmitting other RAW images.

In order to solve the aforementioned problems, the present invention provides an image processing apparatus that can communicate with an image capture apparatus, comprising a processor and a memory coupled to the processor and storing instructions that, when executed by the processor, cause the processor to function as: a receiving unit configured to receive a plurality of RAW images from the image capture apparatus; an extracting unit configured to extract a RAW image satisfying a predetermined condition from among the plurality of RAW images received from the image capture apparatus; a development unit configured to develop the RAW image extracted by the extracting unit; and a transmitting unit configured to transmit, to the image capture apparatus, at least one of the image developed by the development unit and a result extracted by the extracting unit.

In order to solve the aforementioned problems, the present invention provides a method of controlling an image capture apparatus that can communicate with an image processing apparatus that develops RAW images, the method comprising: transmitting, to the image processing apparatus, a plurality of RAW images obtained by an image capturing unit by performing continuous shooting, wherein, in the transmitting, in a case where a setting at the time of shooting is a predetermined shooting setting, one or more RAW images shot earlier than a time point when a predetermined shooting instruction is received are transmitted among the plurality of RAW images before other RAW images are transmitted, and in a case where the setting at the time of shooting is not the predetermined shooting setting, one or more RAW images shot later than the time point when the predetermined shooting instruction is received are transmitted among the plurality of RAW images before other RAW images are transmitted.

In order to solve the aforementioned problems, the present invention provides a method of controlling an image processing apparatus that can communicate with an image capture apparatus, the method comprising: receiving a plurality of RAW images from the image capture apparatus; extracting a RAW image satisfying a predetermined condition from among the plurality of RAW images received from the image capture apparatus; developing the extracted RAW image; and transmitting at least one of the developed image and a result of the extraction to the image capture apparatus.

In order to solve the aforementioned problems, the present invention provides a non-transitory computer-readable storage medium storing a program for causing a processor to execute a method of controlling an image capture apparatus that can communicate with an image processing apparatus that develops RAW images, the method comprising: transmitting, to the image processing apparatus, a plurality of RAW images obtained by an image capturing unit by performing continuous shooting, wherein, in the transmitting, in a case where a setting at the time of shooting is a predetermined shooting setting, one or more RAW images shot earlier than a time point when a predetermined shooting instruction is received are transmitted among the plurality of RAW images before other RAW images are transmitted, and in a case where the setting at the time of shooting is not the predetermined shooting setting, one or more RAW images shot later than the time point when the predetermined shooting instruction is received are transmitted among the plurality of RAW images before other RAW images are transmitted.

In order to solve the aforementioned problems, the present invention provides a non-transitory computer-readable storage medium storing a program for causing a processor to execute a method of controlling an image processing apparatus that can communicate with an image capture apparatus, the method comprising: receiving a plurality of RAW images from the image capture apparatus; extracting a RAW image satisfying a predetermined condition from among the plurality of RAW images received from the image capture apparatus; developing the extracted RAW image; and transmitting at least one of the developed image and a result of the extraction to the image capture apparatus.

According to the present invention, development processing by a server can be performed efficiently.

Further features of the present invention will become apparent from the following description of exemplary embodiments (with reference to the attached drawings).

BRIEF DESCRIPTION OF THE DRAWINGS

FIG. 7 is a flowchart illustrating processing by the digital camera in the first embodiment.

FIG. 8 is a diagram illustrating processing for cutting out RAW image data to be transmitted from a bundle RAW image file in the first to third embodiments.

DESCRIPTION OF THE EMBODIMENTS

Figure 1:
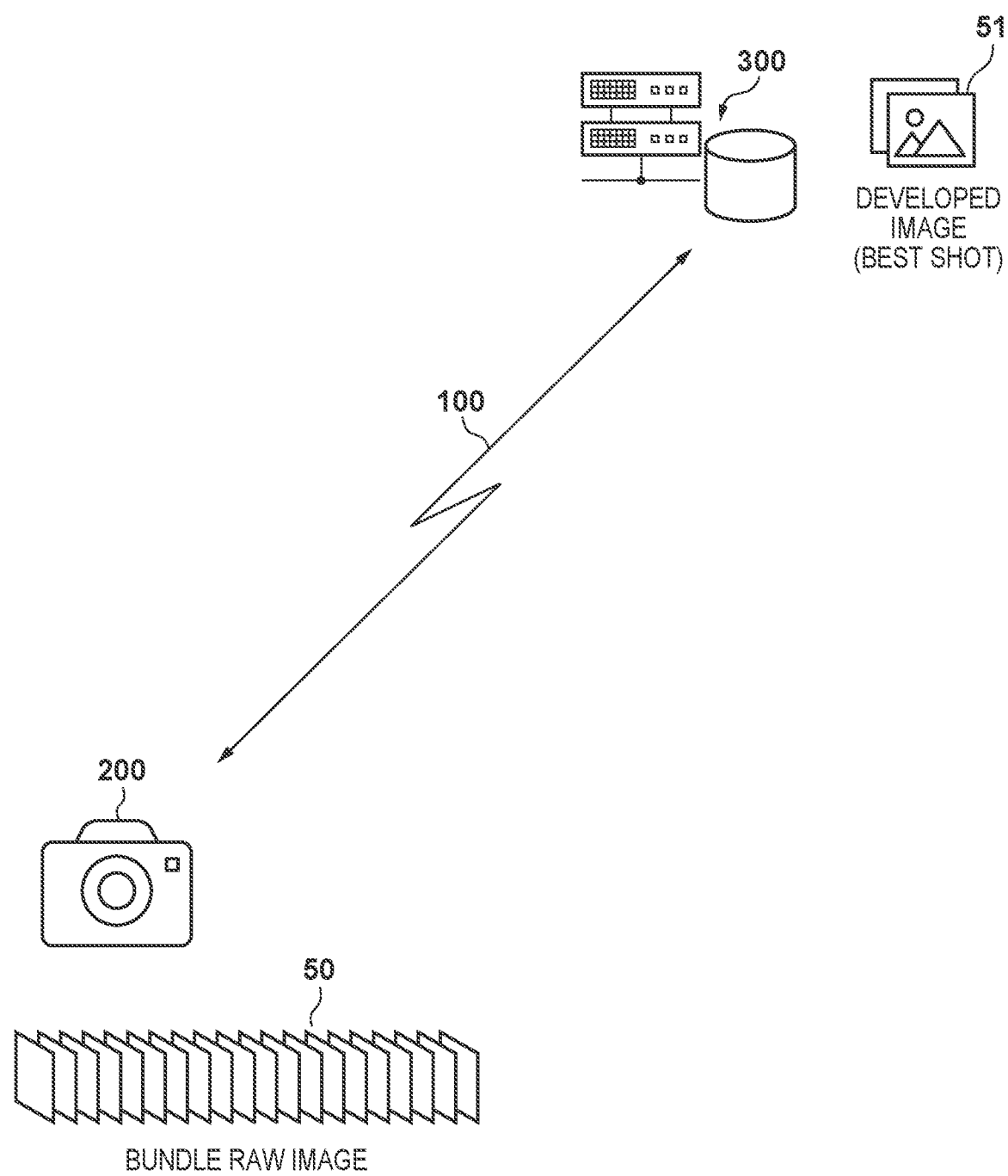
FIG. 1 is a system configuration diagram according to first to third embodiments.

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the present embodiment, an example of a system in which a server computer 300 and a digital camera (hereinafter "camera") 200 serving as an image generating apparatus and an image processing apparatus are connected by a communication network 100 will be described.

Note that, in the system according to the present embodiment, development processing of RAW image data generated by the camera 200 is executed by a cloud server (hereinafter "server") 300 that is present on the network and provides a development processing function. Note that, while an example in which the server 300 executes development processing of RAW image data will be described in the present embodiment, image processing other than development processing may be performed in the server 300.

<System Configuration>

First, a system configuration according to the present embodiment will be described with reference to FIG. 1.

The camera 200 has installed therein an image processing application for utilizing the development processing function of the server 300. The camera 200 is communicatively connected to the server 300 via the communication network 100, which is a wide area network (WAN), the Internet, a public network, or the like.

The camera 200 generates a bundle RAW image file 50 that is formed from a plurality of pieces of RAW image data generated by continuously shooting images by performing continuous shooting (RAW burst shooting), and determines RAW image data to be preferentially transmitted to the server 300 from the bundle RAW image file 50. RAW image data generated by the camera 200 is image data such as a still image or a moving image shot by the digital camera, etc., and is image data that is made into a file without performing development processing thereon.

The camera 200 transmits RAW image data generated by the camera 200 to the server 300, and the server 300 executes development processing on the RAW image data received from the camera 200 and transmits developed image data to the camera 200.

From the plurality of pieces of RAW image data received from the camera 200, the server 300 extracts RAW image data determined as the best shot. Furthermore, the server 300 transmits, to the camera 200, information about the RAW image data determined as the best shot or developed image data 51 of the RAW image data determined as the best shot.

<Configuration of Camera 200>

Figure 2:
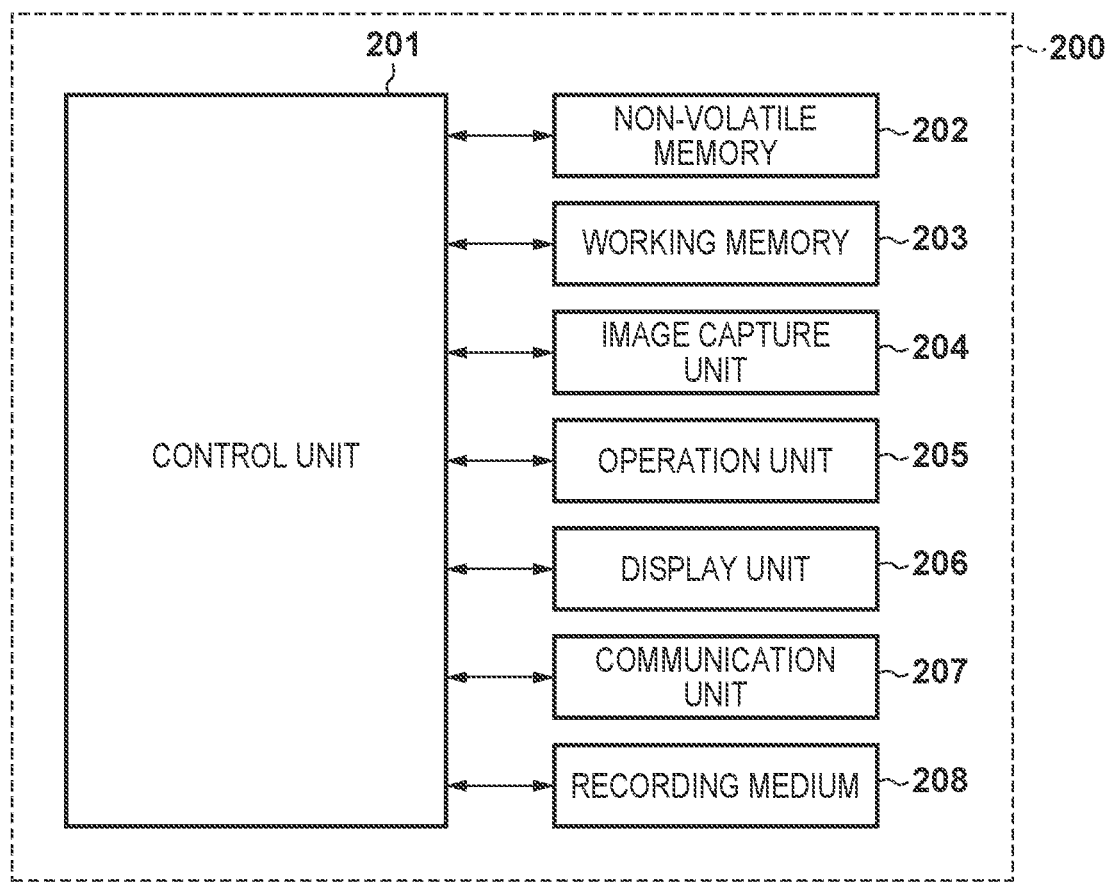
FIG. 2 is a block diagram illustrating a configuration of a digital camera according to the first to third embodiments.

Next, a hardware configuration of the camera 200 will be described with reference to FIG. 2.

Note that, while an example in which the image generation apparatus is applied to an image capture apparatus such as a digital camera will be described in the present embodiment, the present invention is not limited to this. For example, the image generation apparatus may be an information processing apparatus such as a smartphone, which is a type of mobile telephones, a tablet device, a watch-type terminal, or a spectacle-type terminal.

A control unit 201 is an arithmetic processor (CPU) that collectively controls the entire camera 200, and realizes processing in a later-described flowchart by executing programs stored in the later-described non-volatile memory 202. Note that the entire apparatus may be controlled by processing being shared among a plurality of pieces of hardware, rather than the control unit 201 controlling the entire apparatus.

The non-volatile memory 202 has stored therein constants for the operation of the control unit 201, programs, etc. The programs here include a program for executing communication processing with the server 300 described later in the present embodiment. Furthermore, the non-volatile memory 202 has stored therein an operating system (OS), which is the basic software that the control unit 201 executes, and the image processing application, which realizes applied functions in cooperation with the OS. The processing by the camera 200 according to the present embodiment is realized by loading software provided by the image processing application. Note that the image processing application includes software for utilizing the basic functions of the OS installed in the camera 200. Note that the OS of the camera 200 may include software for realizing the processing in the present embodiment. For example, the non-volatile memory 202 is an EEPROM.

A working memory 203 is used as a work area for loading constants and variables for the operation of the control unit 201, programs read from the non-volatile memory 202, etc. Furthermore, the working memory 203 is used as a buffer memory for temporarily holding image data captured by an image capturing unit 204, and as an image display memory for a display unit 206.

The image capturing unit 204 includes a lens group including a zoom lens and a focus lens, and a shutter provided with an aperture function. Furthermore, the image capturing unit 204 includes an image sensor that is constituted by a CCD, a CMOS element, or the like that converts a subject image into electric signals, and an A/D converter that converts analog image signals output from the image sensor into digital signals. By being controlled by the control unit 201, the image capturing unit 204 converts subject image light imaged by the lenses included in the image capturing unit 204 into electric signals using the image sensor, performs noise reduction processing, etc., and outputs image data constituted by digital signals.

The control unit 201 performs various types of image processing other than development processing on RAW image data captured by the image capturing unit 204, generates an image file, and records the image file to a recording medium 208. In the camera 200 according to the present embodiment, RAW image data is recorded to the recording medium 208 in accordance with the Design rule for Camera File system (DCF) specification. Furthermore, the control unit 201 performs automatic focus (AF) processing and automatic exposure (AE) processing by performing predetermined arithmetic processing using captured image data, and controlling the focus lens, aperture, and shutter of the image capturing unit 204 based on the arithmetic results that are obtained.

An operation unit 205 is constituted by operation members such as various switches, buttons, a touch panel, etc., for receiving various operations from a user. For example, the operation unit 205 includes a power button for turning the power on and off, a shutter button for shooting images, a mode setting button for setting the operation mode of the camera 200, etc. Furthermore, a touch panel that is integrally formed with the later-described display unit 206 is also included in the operation unit 205. In addition, the operation unit 205 includes an operation member such as a dedicated connection button for starting communication with an external device via the later-described communication unit 207. Furthermore, the operation unit 205 may be integrated with the camera 200, or may be an external device connected to the camera 200. It suffices for the camera 200 to be capable of being connected to the operation unit 205.

The shutter button is switched to ON when operated halfway, or that is, when a so-called "half-pressed" (shooting preparation instruction) is performed, as an operation performed by the user during image shooting, and generates a first shutter switch signal SW1. In response to the first shutter switch signal SW1 being switched to ON, the control unit 201 controls the image capturing unit 204 and thereby starts shooting preparation operations such as automatic focus (AF) processing, automatic exposure (AE) processing, auto white balance (AWB) processing, and pre-flash (EF) processing. Furthermore, the shutter button is switched to ON when operated completely, or that is, when a so-called "full-pressed" (shooting start instruction) is performed, as an operation performed by the user during image shooting, and generates a second shutter switch signal SW2. The control unit 201 starts a series of shooting operations from the reading of signals from the image capturing unit 204 to the writing of image data to the recording medium 208 in response to the second shutter switch signal SW2 being switched to ON, and terminates the shooting operations in response to the second shutter switch signal SW2 being switched to OFF (shooting termination instruction).

Using the mode setting button, the operation mode of the camera 200 can be set to one of a plurality of operation modes including a shooting mode for shooting still images and moving images, a reproduction mode for reproducing images, and the later-described RAW burst shooting mode. Note that, in RAW burst shooting, pre-shooting "OFF" and pre-shooting "ON" that are described later can be set as a setting at the time of shooting.

The display unit 206 displays image data (including a live view) captured by the image capturing unit 204, image data on which image processing has been executed by the server 300, etc. Furthermore, the display unit 206 performs character display, etc., for interactive operation, such as the display of a graphical user interface (GUI) of the image processing application. For example, the display unit 206 is a display device such as a liquid-crystal display, an organic EL display, or the like. The display unit 206 may be integrated with the camera 200, or may be an external device connected to the camera 200. It suffices for the camera 200 to be capable of being connected to the display unit 206 and to have a function of controlling the display by the display unit 206.

The communication unit 207 is an interface for connecting to an external device such as the server 300. The camera 200 according to the present embodiment can exchange data with an external device via the communication unit 207. For example, RAW image data generated by the camera 200 can be transmitted to an external device via the communication unit 207. Note that, in the present embodiment, the communication unit 207 includes a USB cable or a wired connection interface for HDMI (registered trademark), IEEE 1394, etc. Furthermore, the communication unit 207 includes a wireless connection interface for a wireless local area network (LAN) based on the IEEE 802.11 specification, Bluetooth (registered trademark) based on the IEEE 802.15 specification, etc. The control unit 201 realizes communication with an external device by controlling the communication unit 207.

Image data output from the image capturing unit 204 is written to the recording medium 208, and image files that are already recorded are read from the recording medium 208. The recording medium 208 may be a memory card, a hard disk drive, or the like that is attached to the camera 200, or may be a flash memory or a hard disk drive that is built into the camera 200. It suffices for the camera 200 to have a function of accessing the recording medium 208, at the least.

<Configuration of Server 300>

Figure 3:
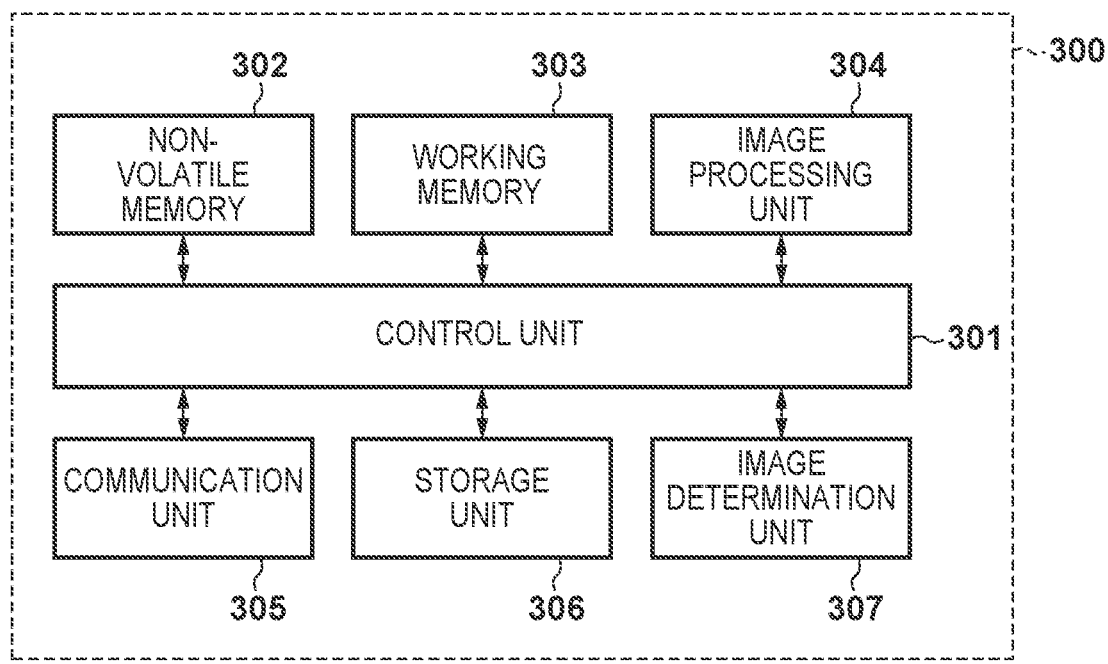
FIG. 3 is a block diagram illustrating a configuration of a server according to the first to third embodiments.

Next, a hardware configuration of the server 300 will be described with reference to FIG. 3.

The server 300 according to the present embodiment includes a control unit 301, a non-volatile memory 302, a working memory 303, an image processing unit 304, a communication unit 305, a storage unit 306, and an image determination unit 307.

The control unit 301 is an arithmetic processor (CPU) that collectively controls the entire server 300, and realizes processing in a later-described flowchart by executing programs stored in the later-described non-volatile memory 302. Note that the entire apparatus may be controlled by processing being shared among a plurality of pieces of hardware, rather than the control unit 301 controlling the entire apparatus.

The non-volatile memory 302 has stored therein constants for the operation of the control unit 301, programs, etc. The programs here include a program for executing communication processing with the camera 200. Furthermore, the non-volatile memory 302 has stored therein an operating system (OS), which is the basic software that the control unit 301 executes, and an image processing program which realizes applied functions in cooperation with the OS. The processing by the server 300 according to the present embodiment is realized by loading software provided by the image processing program. Note that the image processing program includes software for utilizing the basic functions of the OS installed in the server 300. Note that the OS of the server 300 may include software for realizing the processing in the present embodiment. For example, the non-volatile memory 302 is a hard disk drive (HDD), a solid-state drive (SSD) constituted by a flash memory, an EEPROM, a flash memory, an optical disk, or the like.

The working memory 303 is used as a work area for loading constants and variables for the operation of the control unit 301, programs read from the non-volatile memory 302, etc. Furthermore, the working memory 303 is used as a buffer memory for temporarily holding RAW image data received from the camera 200.

The image processing unit 304 is a graphics processing unit (GPU) that generates developed image data obtained by applying development processing such as pixel interpolation processing, luminance signal processing, and color signal processing to RAW image data received from the camera 200.

The communication unit 305 includes software and circuitry for communicating with an external device by HTTP communication, etc. The server 300 according to the present embodiment can exchange data with the camera 200 via the communication unit 305. For example, the server 300 can transmit developed image data developed by the image processing unit 304 to an external device via the communication unit 305. Note that, in the present embodiment, the communication unit 305 includes an interface for performing wireless and wired communication with an external device. The control unit 301 realizes communication with an external device by controlling the communication unit 305. In the present embodiment, the communication unit 305 can connect to the camera 200 using the GET/HEAD methods. Note that the method for connection is not limited to the GET/HEAD methods, and methods such as the POST method or the PUT method may be used. The camera 200 and the server 300 may be connected using a public network, Wi-Fi, or the like when the user performs the connection from outside his/her house, and may be connected via a home access point or the like when the user returns home. Note that the connection with the camera 200 is not limited to this, and the server 300 need not transmit developed image data to the camera 200.

The storage unit 306 is a storage device such as an SSD or a hard disk that stores data including image data received from the camera 200. Note that the server 300 is not limited to communicating with the camera 200, and the server 300 may communicate with other communication devices.

The image determination unit 307 includes software and circuitry for determining the best shot from among RAW image data received from the camera 200 and stored in the storage unit 306, and extracting RAW image data determined as the best shot.

The image processing unit 304 performs development processing on RAW image data determined as the best shot by the image determination unit 307. The developed image data is transmitted to the camera 200 by the communication unit 305.

<Bundle RAW Image and Best-Shot Determination>

Figure 4A:
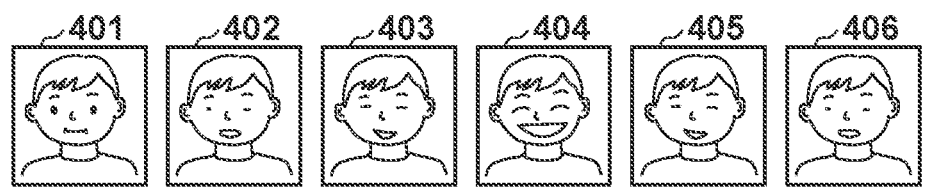
FIG. 4A is a diagram illustrating a bundle RAW image file and best-shot determination in the first to third embodiments.

FIG. 4A is a diagram illustrating a method for extracting an image determined as the best shot from among a plurality of pieces of RAW image data.

In the present embodiment, the best shot is RAW image data determined as being the most suitable among a plurality of RAW images generated by continuously shooting the same subject in response to a predetermined shooting operation by performing RAW burst shooting. There are a plurality of determination conditions for the best shot, such as whether a subject is in focus, whether a subject is captured at a large size and whether a decisive moment is captured. In the present embodiment, a case in which a plurality of (for example, six) images 401 to 406 were shot by continuously shooting one person will be described with reference to FIG. 4A. In this case, the person is smiling the most in image 404, and image 404 is determined as the best shot among images 401 to 406.

Figure 4B:
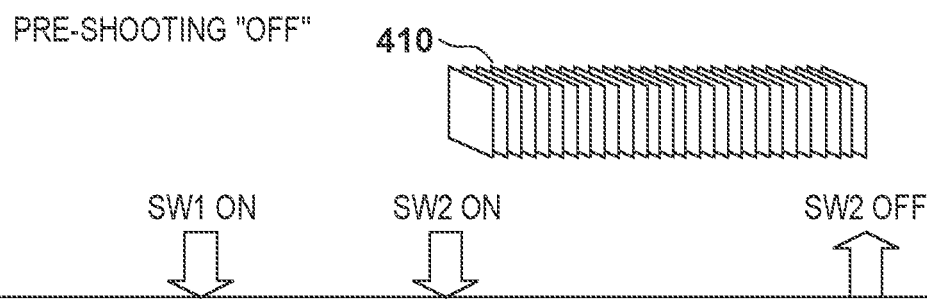
FIG. 4B is a diagram illustrating RAW burst shooting in a case in which pre-shooting is "OFF" in the first to third embodiments.
Figure 4C:
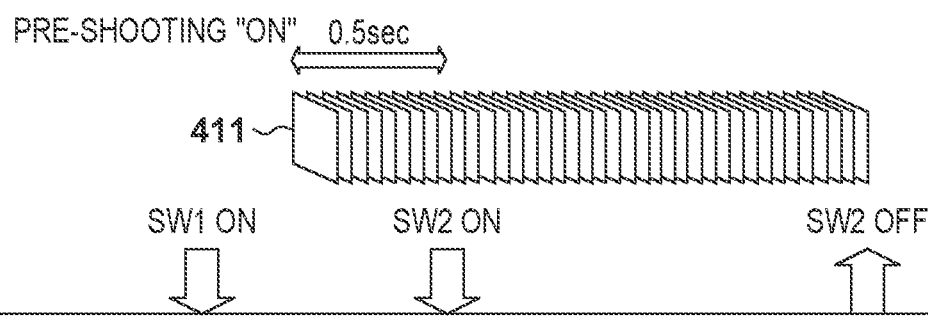
FIG. 4C is a diagram illustrating RAW burst shooting in a case in which pre-shooting is "ON" in the first to third embodiments.

FIGS. 4B and 4C are diagrams illustrating RAW burst shooting.

RAW burst shooting is a method for continuously shooting a plurality of pieces of RAW image data, and pre-shooting "OFF" and pre-shooting "ON" can be set as a predetermined shooting setting. FIG. 4B illustrates an example of shooting operations in a case in which pre-shooting is "OFF", and FIG. 4C illustrates an example of shooting operations in a case in which pre-shooting is "ON". In FIGS. 4B and 4C, the horizontal axis indicates time.

In the pre-shooting "OFF" state in FIG. 4B, continuous shooting is performed from when the second shutter switch signal SW2 is switched to ON (start of shooting) until the second shutter switch signal SW2 is switched to OFF (termination of shooting), and the plurality of pieces of continuously shot RAW image data are recorded as one bundle RAW image file 410.

In the pre-shooting "ON" state in FIG. 4C, continuous shooting is performed until the second shutter switch signal SW2 is switched to OFF from a time point that is later than the time point when the first shutter switch signal SW1 is switched to ON and that is earlier by a predetermined amount of time than the time point when the second shutter switch signal SW2 is switched to ON, and the plurality of pieces of continuously shot RAW image data are recorded as one bundle RAW image file 411. In this case, RAW image data, which are continuously shot during a period until the second shutter switch signal SW2 is switched to OFF from a time that is earlier by the predetermined amount of time (0.5 seconds at maximum) than the time point when the second shutter switch signal SW2 is switched to ON, are recorded.

Figure 4D:
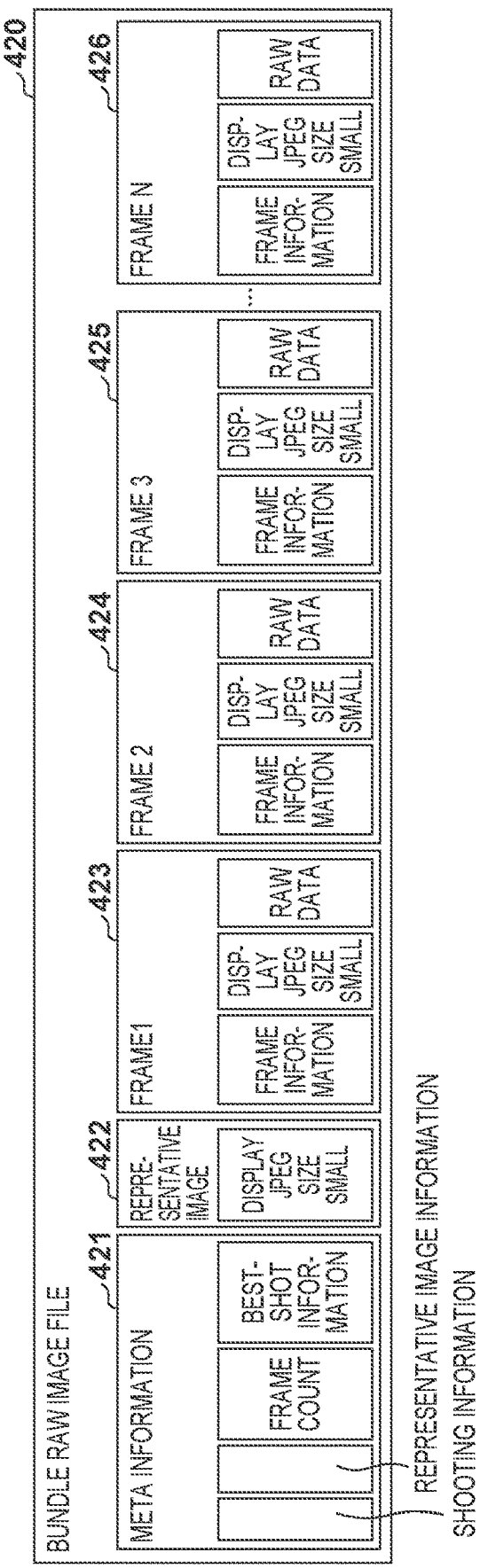
FIG. 4D is a data configuration diagram of a bundle RAW image file in the first to third embodiments.

FIG. 4D is a diagram illustrating an example of a data configuration of a bundle RAW image file generated by performing RAW burst shooting.

A bundle RAW image file 420 includes meta information 421, a representative image 422, and image frames 423 to 426.

The meta information 421 includes shooting information, representative image information, a frame count, and best-shot information.

The representative image information is information including the frame number and the shooting date/time of RAW image data corresponding to the later-described representative image 422, the resolution of the representative image, etc. The frame count is the number of pieces of RAW image data. The best-shot information is information about a frame determined as the best shot. In the present embodiment, the image determination unit 307 of the server 300 determines the best shot, and the determination result is transmitted to the camera 200 via the communication unit 305 of the server 300. However, the present invention is not limited to this, and the best shot may be determined by the user himself/herself or may be automatically determined by the camera 200.

The representative image 422 includes display JPEG data of a representative image representing the entire bundle RAW image file. For example, a display image of a frame shot when the second shutter switch signal SW2 is switched to ON in FIGS. 4B and 4C is recorded as the representative image and is used as an image that is displayed during reproduction and index display.

The image frames 423 to 426 are the plurality of pieces of RAW image data included in the bundle RAW image file 420. The image frame 423 includes frame information of the first frame, a display JPEG (size: small), and RAW data. The image frame 424 includes frame information of the second frame, a display JPEG (size: small), and RAW data. The image frame 425 includes frame information of the third frame, a display JPEG (size: small), and RAW data. The image frame 426 includes frame information of the final frame N, a display JPEG (size: small), and RAW data.

By performing RAW burst shooting using the camera 200, one bundle RAW image file 420, which is a bundle of continuously shot RAW image data, is generated. The server 300 can acquire a best-shot image by extracting one piece of RAW image data determined as being the best shot from the bundle RAW image file 420 received from the camera 200.

<Processing of Server 300>

Next, best-shot extraction processing and development processing executed by the server 300 will be described with reference to FIG. 5.

Figure 5:
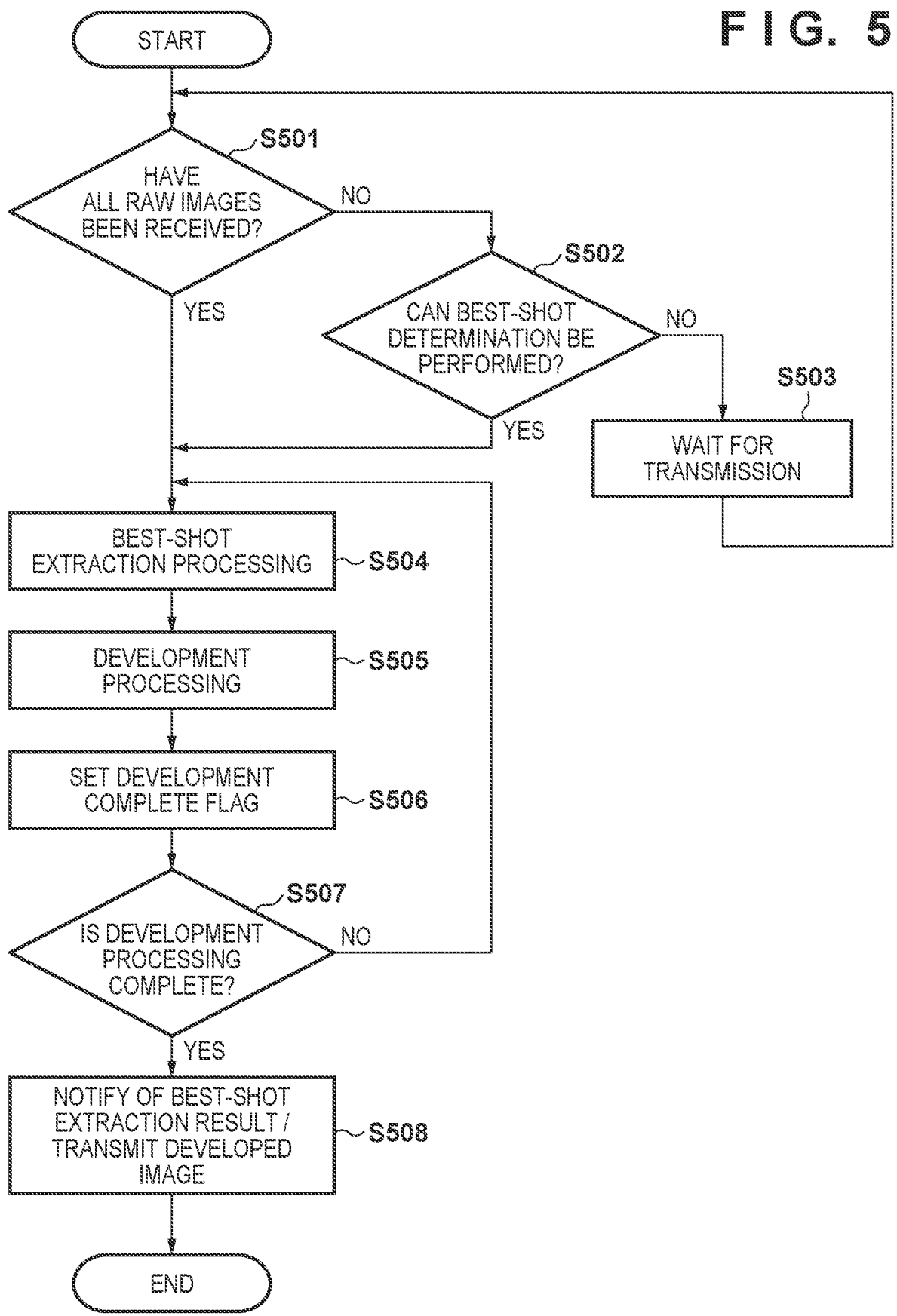
FIG. 5 is a flowchart illustrating processing by the server in the first to third embodiments.

Note that the processing in FIG. 5 is realized by the control unit 301 of the server 300 controlling components by loading and executing, in the working memory 303, programs stored in the non-volatile memory 302. This is the same in later-described FIGS. 7, 9, and 10 as well. Furthermore, the processing in FIG. 5 is started when the server 300 receives a bundle RAW image file from the camera 200.

In step S501, the control unit 301 determines whether or not all pieces of RAW image data included in the bundle RAW image file transmitted from the camera 200 have been received. The control unit 301 advances the processing to step S504 when the control unit 301 determines that all pieces of RAW image data have been received, and advances the processing to step S502 when the control unit 301 determines that not all pieces of RAW image data have been received. The control unit 301 determines whether or not all pieces of RAW image data have been received by referring to the frame count in the meta information 421 in the received bundle RAW image file 420.

In step S502, the control unit 301 determines whether or not the best-shot determination can be performed using the subset of RAW image data that has been received from the camera 200. The control unit 301 advances the processing to step S504 when the control unit 301 determines that the best-shot determination can be performed, and advances the processing to step S503 when the control unit 301 determines that the best-shot determination cannot be performed. For example, the determination of whether or not the best shot can be determined, is performed by determining whether or not a plurality of pieces or more of RAW image data have been received, or whether or not a tendency of the subject can be determined from the RAW image data already received. Furthermore, the determination of whether or not the best shot can be determined, is performed, such as that when it is determined that no more RAW image data is required for determining the best shot, by determining whether or not the control unit 301 can extract the best shot from the subset of RAW image data of the bundled RAW image file.

In step S503, the control unit 301 waits until the rest of the RAW image data is transmitted from the camera 200, and returns the processing to step S501.

In step S504, the control unit 301 performs the best-shot determination using the image determination unit 307, and advances the processing to step S505. A plurality of conditions, such as whether a subject is in focus, whether a subject is captured at a large size, and whether a decisive moment is captured, are used in the best-shot determination, and the best-shot determination can be performed by changing and combining conditions based on subject recognition results. Note that the method for the best-shot determination is not limited to this, and any method may be used. For example, various algorithms may be combined using artificial intelligence (AI), or user's shooting tendecy may be learned and reflected in the best-shot determination.

In step S505, the control unit 301 uses the image processing unit 304 and performs development processing on RAW image data determined as the best shot, and advances the processing to step S506. Note that the parameters of the development processing executed by the image processing unit 304 can be set by the user as desired, or can be automatically set by the server 300 using artificial intelligence (AI). Furthermore, the RAW image data can also be retained as-is without performing development processing.

In step S506, the control unit 301 sets a development-complete flag indicating the developed state to the RAW image data on which development processing is performed in step S505, and advances the processing to step S507. Note that the development-complete flag may be stored in a dedicated storage area in the working memory 303 or the non-volatile memory 302.

In step S507, the control unit 301 determines whether or not development processing is complete. The control unit 301 advances the processing to step S508 when the control unit 301 determines that development processing is complete and returns the processing to step S504 when the control unit 301 determines that development processing is not complete. The determination of whether or not development processing is to be terminated is performed by determining, based on a setting of the maximum number of pieces of RAW image data to be determined as the best shots and developed from one bundle RAW image file, whether or not the set number of pieces of RAW image data have been developed. The maximum number of pieces of RAW image data to be determined as the best shots and developed may be set in advance to the server 300, and it suffices when the maximum number of pieces of RAW image data to be determined as the best shots and developed can be set to the server in some way.

In step S508, the control unit 301 notifies the camera 200 of the best-shot extraction result, transmits developed image data to the camera 200, and terminates processing. Note that the details of the processing in step S508 will be described later with reference to FIGS. 6A and 6B. In notifying the camera 200 of the best-shot extraction result, the server 300 may notify the camera 200 of only best-shot information such as the frame number(s) of RAW image data determined by the image determination unit 307 of the server 300. Alternatively, the server 300 may transmit developed image data obtained by developing RAW image data determined as the best shots, or may transmit both the best-shot information and the developed image data.

<Notification of Best-Shot Extraction Result>

Next, the processing in which the server 300 notifies the camera 200 of a best-shot extraction result will be described with reference to FIGS. 6A and 6B.

Figure 6A:
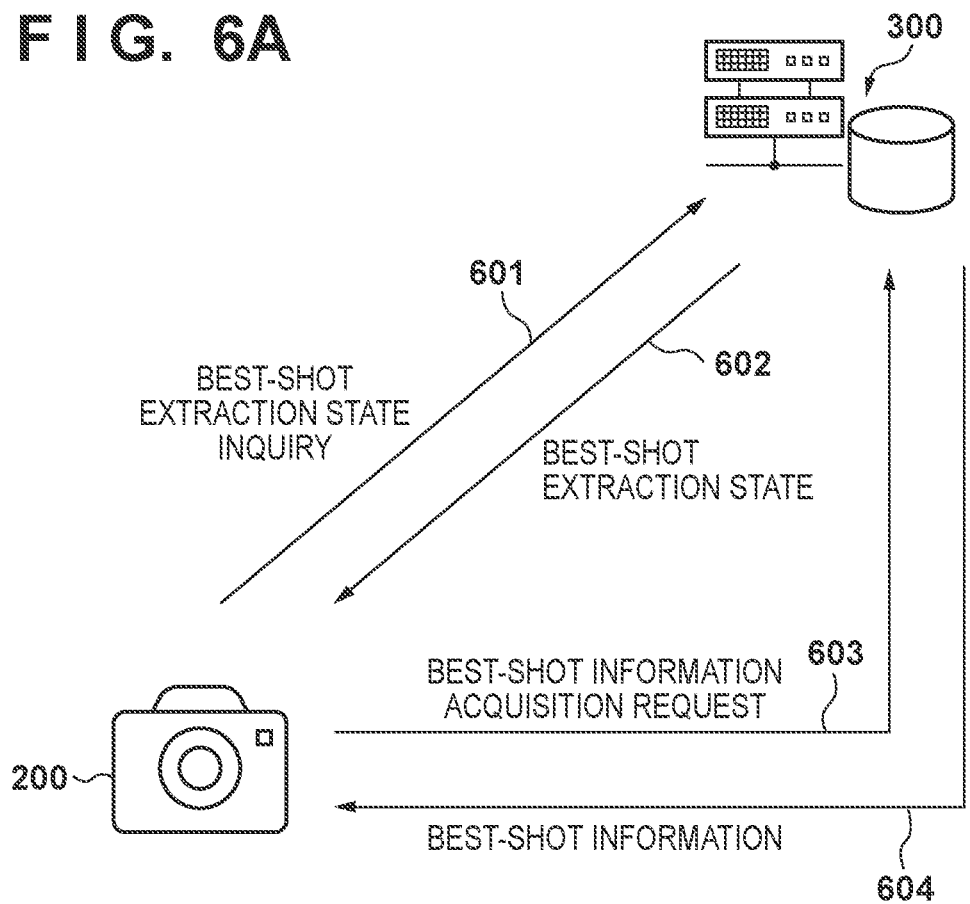
FIGS. 6A and 6B are diagrams illustrating processing for providing a notification of a best-shot extraction result in the first to third embodiments.

FIG. 6A is a diagram illustrating the processing for providing a notification of a best-shot extraction result. The camera 200 makes an inquiry as to which frame in a bundle RAW image file that the camera 200 transmitted to the server 300 has been determined as the best shot by transmitting a best-shot extraction state inquiry 601 to the server 300. The transmission of the inquiry is triggered when image reproduction is performed on the camera 200, for example. When the camera 200 is connected to the server 300 at all times, there is no need to take the connection timing into consideration. However, in a case in which the camera 200 is not connected to the server 300, connection with the server 300 needs to be established when the best-shot extraction state inquiry 601 is to be made. When the server 300 receives the best-shot extraction state inquiry 601 from the camera 200, the server 300 transmits a best-shot extraction state 602 in the server 300 to the camera 200 as a response thereto.

Figure 6B:
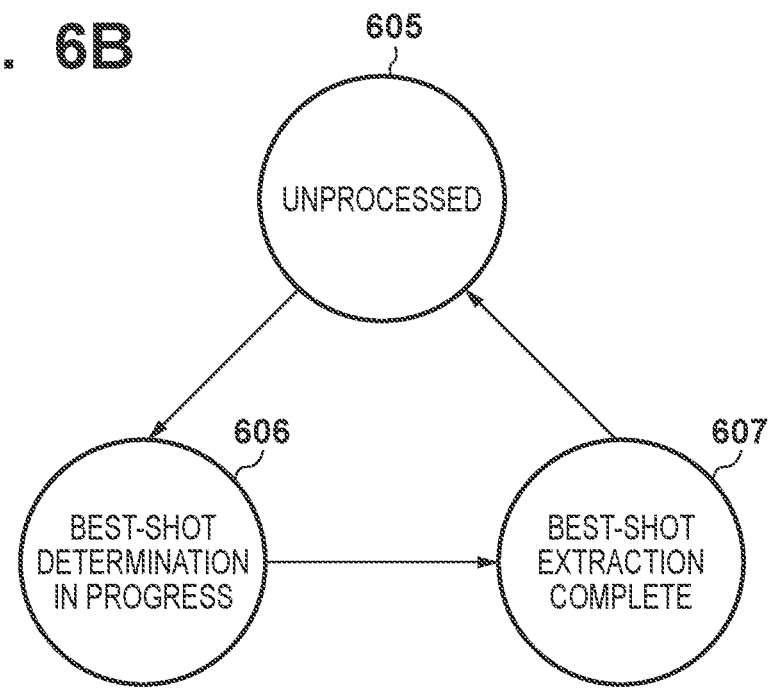

FIG. 6B is a diagram illustrating an example of the transition of the best-shot extraction state of the server 300. A state in which the server 300 has received a bundle RAW image file but has not started best-shot extraction processing yet is referred to as an "unprocessed" state 605. A state while best-shot extraction processing is in progress is referred to as a "best-shot determination in progress" state 606. A state in which best-shot extraction processing has completed is referred to as a "best-shot extraction complete" state 607. Note that, while three states are illustrated as examples in the example in FIGS. 6A and 6B, there may be other states.

When the best-shot extraction state 602 that is the response to the best-shot extraction state inquiry 601 is the "unprocessed" state 605 or the "best-shot determination in progress" state 606, the best-shot extraction state inquiry 601 is repeatedly transmitted to the server 300 until the best-shot extraction state 602 changes to the "best-shot extraction complete" state 607. When the camera 200 determines that the best-shot extraction state 602 of the server 300 has changed to the "best-shot extraction complete" state 607, the camera 200 transmits a best-shot information acquisition request 603 to the server 300 and makes an inquiry to the server 300 about the frame extracted as the best shot. As a response to the best-shot information acquisition request 603, the server 300 transmits best-shot information 604 such as the frame number of RAW image data determined as the best shot from the bundle RAW image file.

<Processing for Transmitting Part of Bundle RAW Image File to Server 300>

Next, processing in which part of a bundle RAW image file is selected and transmitted to the server 300 by the camera 200 will be described with reference to FIGS. 7 and 8.

The camera 200 selects RAW image data to be used as a reference frame from a bundle RAW image file generated by performing the RAW burst shooting described in FIGS. 4B and 4C. Furthermore, the camera 200 transmits, to the server 300, part of the bundle RAW image file obtained by cutting out a predetermined number of pieces of RAW image data starting from the reference frame.

FIG. 8 illustrates a comparison between a case in which pre-shooting is "ON" and a case in which pre-shooting is "OFF", with regard to a result 802, 812 obtained by cutting out a reference frame 801, 811 and a predetermined number of pieces of RAW image data from a bundle RAW image file (RAW image bundle). When pre-shooting is "ON", the recording of RAW image data is started immediately before the second shutter switch signal SW2 is switched to ON (0.5 seconds before the second shutter switch signal SW2 is switched to ON, at maximum). Due to this, RAW image data can be recorded by going back in time even when the release of the shutter (the switching of the second shutter switch signal SW2 to on) is not in time for the desired moment, and thus moments for which the shutter release timing is difficult to predict, such as the moment when a bird takes flight, can be shot. Accordingly, it can be considered that, when pre-shooting is "ON", the best shot is often shot immediately before the second shutter switch signal SW2 is switched to ON. On the other hand, pre-shooting is often set to "OFF" when the shutter release timing can be predicted, and it can be considered that, when pre-shooting is "OFF", the second shutter switch signal SW2 is switched to OFF and shooting is terminated upon the best shot being successfully shot. Accordingly, it can be considered that, when pre-shooting is "OFF", the best shot is often shot immediately before the switching of the second shutter switch signal SW2 is switched to OFF.

Accordingly, in the first embodiment, when pre-shooting is "ON", a priority of a transmission for RAW images shot during a period until the second shutter switch signal SW2 is switched to ON from a time point that is later than the time point when the first shutter switch signal SW1 is switched to ON and that is earlier by a predetermined amount of time than the time point when the second shutter switch signal SW2 is switched to ON, is set to be higher so that such images are more preferentially transmitted than other RAW images.

Furthermore, when pre-shooting is "OFF", the priority of the transmission for RAW images shot during a period until the second shutter switch signal SW2 is switched to OFF from a time point that is earlier by a predetermined amount of time than the time point when the second shutter switch signal SW2 is switched to OFF, is set to be higher so that such RAW images are more preferentially transmitted than other RAW images.

Next, processing by the camera 200 will be described with reference to FIG. 7.

The processing in FIG. 7 is realized by the control unit 201 of the camera 200 controlling components by loading and executing, in the working memory 203, programs stored in the non-volatile memory 202. Furthermore, the processing in FIG. 7 is started once the user operates the operation unit 205 of the camera 200 and performs RAW burst shooting, or when RAW image data already recorded in the recording medium 208 is displayed on the display unit 206.

In step S701, the control unit 201 acquires a bundle RAW image file type, and advances the processing in step S702. The bundle RAW image file type is an attribute as to whether the bundle RAW image file was shot with pre-shooting "ON" or with pre-shooting "OFF".

In step S702, the control unit 201 determines whether or not the bundle RAW image file type indicates that the bundle RAW image file was shot with pre-shooting "ON". The control unit 201 advances the processing to step S703 when the control unit 301 determines that the bundle RAW image file was shot with pre-shooting "ON", and advances the processing to step S704 when the control unit 301 determines that the bundle RAW image file was shot with pre-shooting "OFF".

In step S703, the control unit 201 searches from the bundle RAW image file RAW image data that was shot at the time point when the second shutter switch signal SW2 was switched to ON. Since the representative image 422 of the bundle RAW image file 420 is RAW image data shot when the second shutter switch signal SW2 is switched to ON as described with reference to FIG. 4D, the control unit 201 searches from the representative image information in the meta information 421 the frame number of the representative image. It can be considered that, when pre-shooting is "ON", RAW image data shot slightly earlier than the time point when the user operates the operation unit 205 and the second shutter switch signal SW2 is switched to ON is often the best shot. Thus, the control unit 201 selects the RAW image data shot at the time point when the second shutter switch signal SW2 is switched to ON as a reference frame 811.

In step S704, the control unit 201 searches from the bundle RAW image file RAW image data that was shot at the time point when the second shutter switch signal SW2 was switched to OFF. Since RAW burst shooting terminates at the time point when the second shutter switch signal SW2 is switched to OFF, the final frame in the bundle RAW image file is the RAW image data shot at the time point when the second shutter switch signal SW2 is switched to OFF. It can be considered that, when pre-shooting is "OFF", RAW image data shot slightly earlier than the time point when the user operates the operation unit 205 and the second shutter switch signal SW2 is switched to OFF is often the best shot. Thus, the control unit 201 selects the RAW image data shot at the time point when the second shutter switch signal SW2 is switched to OFF as a reference frame 801.

In step S705, the control unit 201 cuts out, from the bundle RAW image file, a predetermined number of pieces (for example, 5 pieces) of RAW image data starting from the reference frame 801, 811 chosen in step S703 or S704, and advances the processing to step S706. The cutting out of the predetermined number of pieces of RAW image data is performed such that a preset number of pieces of RAW image data are cut out in the direction of later to earlier shooting times from the reference frame 801, 811. The predetermined number of pieces of RAW image data may be set by the user operating the operation unit 205 of the camera 200, or may be set as a number of pieces of RAW image data that is in accordance with image characteristics obtained by the control unit 201 analyzing the subject, the shooting parameters at the time of shooting, etc., of the bundle RAW image data having been shot. Furthermore, the predetermined number of pieces of RAW image data may be varied between a case in which pre-shooting is "ON" and a case in which pre-shooting is "OFF". The control unit 201 generates a new bundle RAW image file 802, 812 from the subset of RAW image data cut out from the bundle RAW image file.

Note that, when pre-shooting is "OFF", the control unit 201 can also set RAW image data shot at the time point when the second shutter switch signal SW2 is switched to ON as the reference frame 801 in step S704. In contrast to when pre-shooting is "ON", the frame position at which the best shot is present may vary over a certain range depending on the manner in which the user performs shooting when pre-shooting is "OFF". Thus, the leading frame, which corresponds to the time point when the second shutter switch signal SW2 is switched to ON, can also be set as the reference frame 801. In this case, in step S705, the control unit 201 cuts out the predetermined number of pieces of RAW image data in the direction of earlier to later shooting times from the reference frame (leading frame).

In step S706, the control unit 201 transmits the bundle RAW image file 802, 812 generated in step S705 to the server 300 via the communication unit 207, and terminates processing.

As described, according to the first embodiment, the camera 200, in accordance with the state as to whether pre-shooting is "ON" or "OFF", selects RAW image data to be used as a reference frame from a bundle RAW image file generated by performing RAW burst shooting. Furthermore, the camera 200 transmits, to the server 300, part of the bundle RAW image file obtained by cutting out a predetermined number of pieces of RAW image data starting from the reference frame. In such a manner, by changing the reference frame in accordance with the state as to whether pre-shooting is "ON" or "OFF", the probability of the best shot being included in the RAW image data that is cut out increases. Thus, the data amount during communication can be reduced and the processing time of RAW image data by the server 300 can be reduced compared to when all pieces of RAW image data included in the bundle RAW image file are transmitted to the server 300.

Second Embodiment

Next, the second embodiment will be described.

In the first embodiment, an example in which RAW image data in which the best shot is considered as being included is cut out from a bundle RAW image file and transmitted to the server 300 has been described. In contrast, in the second embodiment, processing in which transmission is performed preferentially from RAW image data in which the probability of the best shot being included is high will be described.

In the first embodiment, the RAW image data that is cut out may not include the best shot depending on the shooting scene and shooting method. Thus, in the second embodiment, transmission is performed in order from RAW image data in which the probability of the best shot being included is high.

Figure 9:
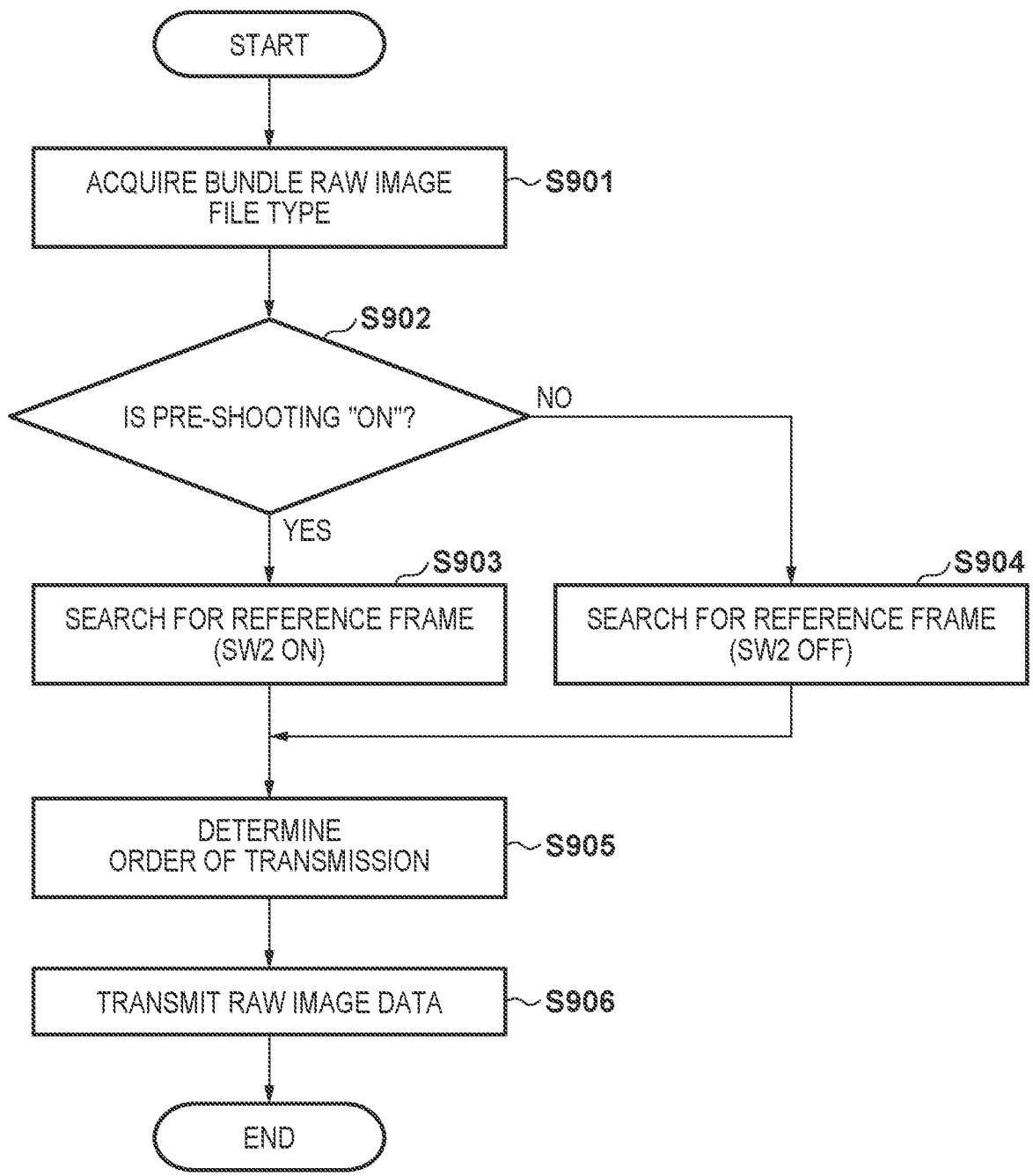
FIG. 9 is a flowchart illustrating processing by the digital camera in the second embodiment.

FIG. 9 is a flowchart illustrating processing by the camera in the second embodiment.

Steps S901 to S904 are the same as steps S701 to S704 in the first embodiment.

In step S905, the control unit 201 determines the order of transmission from the reference frame 801, 811, and advances the processing to step S906. As the order of transmission, when pre-shooting is "ON", transmission is performed from the reference frame 811 to the leading frame in the direction of later to earlier shooting times, and then transmission is performed from the reference frame 811 to the final frame in the direction of earlier to later shooting times. Furthermore, when pre-shooting is "OFF", transmission is performed from the reference frame 801 to the leading frame in the direction of later to earlier shooting times. Thus, transmission can be performed preferentially from RAW image data frames for which the probability of being the best shot is high.

In step S906, the control unit 201 transmits RAW image data to the server 300 in accordance with the order determined in step S905, and terminates processing.

As described above, according to the second embodiment, the camera 200, in accordance with the state as to whether pre-shooting is "ON" or "OFF", selects RAW image data to be used as a reference frame from a bundle RAW image file. Furthermore, the camera 200 determines the order in which transmission is to be performed from the reference frame, and transmits all pieces of RAW image data included in the bundle RAW image file in accordance with the determined order. Thus, transmission to the server 300 can be performed preferentially from RAW image data for which the probability of being the best shot is high, and processing of RAW image data by the server 300 can be performed efficiently.

Third Embodiment

Next, the third embodiment will be described.

In the second embodiment, an example in which transmission is performed preferentially from RAW image data for which the probability of being the best shot is high has been described. In contrast, in the third embodiment, processing in which the transmission of RAW image data is stopped when a best-shot determination completion notification is received from the server 300 while transmission is being preferentially performed from RAW image data for which the probability of being the best shot is high will be described.

Figure 10:
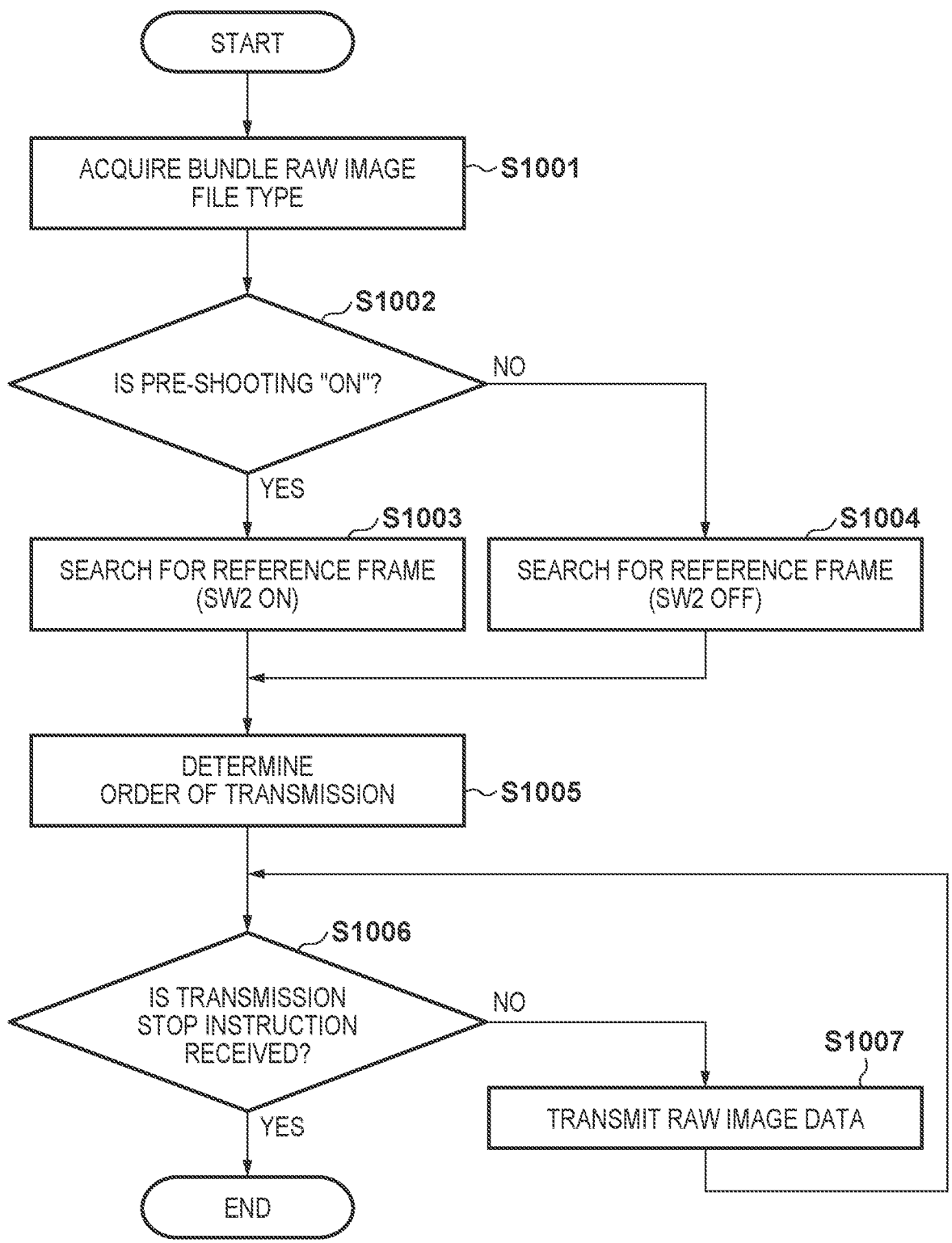
FIG. 10 is a flowchart illustrating processing by the digital camera in the third embodiment.

FIG. 10 is a flowchart illustrating processing by the camera in the third embodiment.

Steps S1001 to S1005 are the same as steps S901 to S905 in the second embodiment.

In step S1006, the control unit 201 determines whether or not a transmission stop instruction is received from the server 300. The control unit 201 stops the transmission and terminates processing when the transmission stop instruction is received, and advances the processing to step S1007 when the transmission stop instruction is not received. The transmission stop instruction corresponds to the notification of the best-shot extraction state 602 of the server 300 in FIG. 6A, and it is determined that the transmission stop instruction has been issued when the best-shot extraction state 602 transitions to the "best-shot extraction complete" state 607.

In step S1007, the control unit 201 transmits RAW image data in accordance with the order determined in step S1005, and returns the processing to step S1006.

As described above, according to the third embodiment, the camera 200, in accordance with the state as to whether pre-shooting is "ON" or "OFF", selects RAW image data to be used as a reference frame from a bundle RAW image file. Furthermore, the camera 200 determines the order in which transmission is to be performed from the reference frame, and transmits all pieces of RAW image data included in the bundle RAW image file in accordance with the determined order. In addition, when a transmission stop instruction is received from the server 300 during the transmission of RAW image data, the camera 200 stops the subsequent transmission of RAW image data. Thus, the data amount during communication can be reduced and the processing time of RAW image data by the server 300 can be reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-140215, filed Aug. 21, 2020 which is hereby incorporated by reference herein in its entirety.

What is claimed is:

1. An image capture apparatus that can communicate with an image processing apparatus that develops RAW images, comprising:

a processor and a memory coupled to the processor and storing instructions that, when executed by the processor, cause the processor to function as:
an image capturing unit; and
a communication unit configured to transmit, to the image processing apparatus, a plurality of RAW images obtained by the image capturing unit by performing continuous shooting,
wherein the communication unit,
in a case where a setting at the time of shooting is a predetermined shooting setting, transmits one or more RAW images shot earlier than a time point when a predetermined shooting instruction is received among the plurality of RAW images before transmitting other RAW images, and
in a case where the setting at the time of shooting is not the predetermined shooting setting, transmits one or more RAW images shot later than the time point when the predetermined shooting instruction is received among the plurality of RAW images before transmitting other RAW images.

2. The apparatus according to claim 1,
wherein the processor further functions as a determination unit configured to determine a priority of RAW images to be transmitted to the image processing apparatus from among the plurality of RAW images in accordance with the setting at the time of shooting, and
wherein the communication unit transmits the plurality of RAW images to the image processing apparatus in accordance with the priority determined by the determination unit.

3. The apparatus according to claim 2, wherein,
in a case where the setting at the time of shooting is the predetermined shooting setting, the determination unit determines the priority of one or more RAW images shot during a period until the start of shooting from a time point that is later than the time point when a shooting preparation instruction is received and that is earlier by a predetermined amount of time than the time point when the predetermined shooting instruction is received so as to be higher than the priority of other RAW images.

4. The apparatus according to claim 2, wherein,
in a case where the setting at the time of shooting is not the predetermined shooting setting, the determination unit determines the priority of one or more RAW images shot during a period until a time point when a shooting termination instruction is received from a time point that is earlier by a predetermined amount of time than the time point when the shooting termination instruction is received so as to be higher than the priority of other RAW images.

5. The apparatus according to claim 4, wherein,
in a case where the setting at the time of shooting is the predetermined shooting setting, the determination unit determines the priority so that one or more RAW images shot during a period until when the predetermined shooting instruction is received from a time point that is earlier by a predetermined amount of time than the time point when the predetermined shooting instruction is received are transmitted in order in a direction of later to earlier shooting times, and then a plurality of RAW images shot during a period until the time point when the shooting termination instruction is received from a time point when the predetermined shooting instruction is received are transmitted in order in a direction of earlier to later shooting times, and, in a case where the setting at the time of shooting is not the predetermined shooting setting, the determination unit determines the priority so that a plurality of RAW images shot during a period until the time point when the shooting termination instruction is received from the time point when the predetermined shooting instruction is received are transmitted in order in the direction of later to earlier shooting times.

6. The apparatus according to claim 5, wherein,
in a case where a transmission stop instruction from the image processing apparatus is received while RAW images are being transmitted in the determined order, the determination unit stops a transmission of the RAW images.

7. The apparatus according to claim 6, wherein,
in a case where an image satisfying a predetermined condition is extracted by the image processing apparatus from among a plurality of RAW images received from the image capture apparatus, the communication unit stops the transmission of the RAW images.

8. The apparatus according to claim 1, wherein the setting at the time of shooting is a setting regarding pre-shooting.

9. The apparatus according to claim 1, wherein the predetermined shooting instruction is a shooting start instruction.

10. A method of controlling an image capture apparatus that can communicate with an image processing apparatus that develops RAW images, the method comprising:
transmitting, to the image processing apparatus, a plurality of RAW images obtained by an image capturing unit by performing continuous shooting,
wherein, in the transmitting,
in a case where a setting at the time of shooting is a predetermined shooting setting, one or more RAW images shot earlier than a time point when a predetermined shooting instruction is received are transmitted before other RAW images among the plurality of RAW images are transmitted, and
in a case where the setting at the time of shooting is not the predetermined shooting setting, one or more RAW images shot later than the time point when the predetermined shooting instruction is received are transmitted before other RAW images among the plurality of RAW images are transmitted.

11. A non-transitory computer-readable storage medium storing a program for causing a processor to execute a method of controlling an image capture apparatus that can communicate with an image processing apparatus that develops RAW images, the method comprising:
transmitting, to the image processing apparatus, a plurality of RAW images obtained by an image capturing unit by performing continuous shooting,
wherein, in the transmitting,
in a case where a setting at the time of shooting is a predetermined shooting setting, one or more RAW images shot earlier than a time point when a predetermined shooting instruction is received are transmitted among the plurality of RAW images before other RAW images are transmitted, and
in a case where the setting at the time of shooting is not the predetermined shooting setting, one or more RAW images shot later than the time point when the predetermined shooting instruction is received are transmitted among the plurality of RAW images before other RAW images are transmitted.

* * * * *